United States Patent
Brown et al.

(10) Patent No.: US 7,065,501 B1
(45) Date of Patent: Jun. 20, 2006

(54) MANAGING HOME INVENTORY

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,320

(22) Filed: Apr. 28, 2000

(51) Int. Cl.
G06Q 30/00 (2006.01)

(52) U.S. Cl. .......................................... 705/28; 705/22

(58) Field of Classification Search ................. 705/22, 705/23, 28, 24, 26, 27
See application file for complete search history.

(56) References Cited

U.S. PATENT DOCUMENTS

| | | | |
|---|---|---|---|
| 4,882,724 A | | 11/1989 | Vela et al. |
| 4,992,940 A | | 2/1991 | Dworkin |
| 5,047,614 A | * | 9/1991 | Bianco ........................ 235/385 |
| 5,091,713 A | * | 2/1992 | Horne et al. ................. 340/541 |
| 5,691,684 A | | 11/1997 | Murrah |
| 5,798,694 A | | 8/1998 | Reber et al. |
| 5,969,606 A | | 10/1999 | Reber et al. |
| 5,983,200 A | | 11/1999 | Slotznick |
| 6,023,683 A | * | 2/2000 | Johnson et al. ............... 705/26 |
| 6,204,763 B1 | * | 3/2001 | Sone ....................... 340/568.1 |
| 6,341,271 B1 | * | 1/2002 | Salvo et al. .................... 705/28 |
| 6,418,416 B1 | * | 7/2002 | Rosenberg et al. ........... 705/28 |
| 6,430,541 B1 | * | 8/2002 | Brown et al. ................. 705/28 |

OTHER PUBLICATIONS

Derfler, Frank J. et. al. How Networks Work, Millennium Ed., Que Corporation, Jan. 2000.*
White, Ron, How Computers Work Millennium Ed. Que Corporation, Sep. 1999.*
Gralla, Preston, How the Internet Works, Millennium Ed., Que Corporation, Aug. 1999.*
U.S. Appl. No. 09/560,317, filed Apr. 28, 2000, Michael W. Brown, et al.
U.S. Appl. No. 09/560,386, filed Apr. 28, 2000, Michael W. Brown, et al.
U.S. Appl. No. 09/560,319, filed Apr. 28, 2000, Michael W. Brown, et al.

* cited by examiner

*Primary Examiner*—Andrew J. Fischer
(74) *Attorney, Agent, or Firm*—Marilyn Smith Dawkins; Dillon & Yudell LLP

(57) ABSTRACT

In accordance with the present invention, a storage area is provided within a particular home for storing food-related items. A database of intended food-related inventory items for the storage area is adjusted by a controller according to food-related inventory preferences received at the controller. The controller updates the database of intended food-related inventory items according to inputs from a monitoring device that monitors the addition and removal of food-related items within the storage area. A communication medium coupled to the controller transmits a selection of items from among the database of intended inventory items that are absent from the storage area.

12 Claims, 7 Drawing Sheets

US 7,065,501 B1

MANAGING HOME INVENTORY

CROSS-REFERENCE TO RELATED APPLICATIONS

The present application is related to the following co-pending applications, which are filed on even date herewith and incorporated herein by reference:

(1) U.S. patent application Ser. No. 09/560,317;
(2) U.S. patent application Ser. No. 09/560,317; and
(3) U.S. patent application Ser. No 09/560,319.

BACKGROUND OF THE INVENTION

1. Technical Field

The present invention relates in general to a storage monitor and, in particular, to a method, system, and program for electronically managing a storage area. Still more particularly, the present invention relates to a method, system and program for managing inventory of a storage area according to food-related inventory preferences for a particular user.

2. Description of the Related Art

A number of smart kitchen systems have been proposed to monitor food items within storage areas of the kitchen. Storage areas might include refrigerators, freezers, pantries and other storage areas within a kitchen. These kitchen monitoring systems often utilize bar code scanners, electronic tag sensors and other methods to detect the addition and removal of items within a particular storage area or areas.

In addition, U.S. Pat. No. 5,798,694 provides for monitoring the temperature, humidity and acidity of a food item in order to determine whether the food item is suitable for consumption. Specialized containers include components for tracking the temperature and humidity exposure of the food in the container and transmitting the monitored temperatures.

However, while existing smart kitchen systems provide for monitoring food items, maintaining a list of current food items and monitoring the suitability of items for consumption, these smart kitchens do not manage the inventory according to inventory related preferences for a particular user or a particular home. In addition, these smart kitchens do not manage inventory according to meal plans, weather conditions, seasonal items, etc. for a particular user or a particular home. Moreover, these smart kitchens do not provide a listing of food-related items that are absent from a kitchen such that these food items may be ordered or added to an electronic grocery list.

SUMMARY OF THE INVENTION

In view of the foregoing, it is therefore an object of the present invention to provide an improved storage monitoring system.

It is another object of the present invention to provide an improved method, system and program for electronically managing a storage area.

It is yet another object of the present invention to provide an improved method, system and program for managing inventory of a storage area according to food-related inventory preferences for a particular user.

In accordance with the method, system and program of the present invention, a storage area is provided within a particular home for storing food-related items. A database of intended food-related inventory items for the a storage area is adjusted by a controller according to food-related inventory preferences received at the controller. The controller updates the database of intended food-related inventory items according to inputs from a monitoring device that monitors the addition and removal of food-related items within the storage area. A communication medium coupled to the controller transmits a selection of items from among the database of intended inventory items that are absent from the storage area.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The present invention may be executed in a variety of systems, including a variety of computing systems and electronic devices under a number of different operating systems. In a preferred embodiment of the present invention, the computer system that incorporates communication features that provide for telephony, enhanced telephony, messaging and information services. Preferably, in order to enable at least one of these communication features, the computer system is able to be connected to a network, such as the Internet by either a wired link or wireless link. In addition, the computer system may be a stand-alone system or part of a network such as a local-area network (LAN) or a wide-area network (WAN). Therefore, in general, the present invention is preferably executed in a computer system that performs computing tasks such as manipulating data in storage that is accessible to the computer system. In addition, the computer system includes at least one output device and at least one input device.

Figure 1:
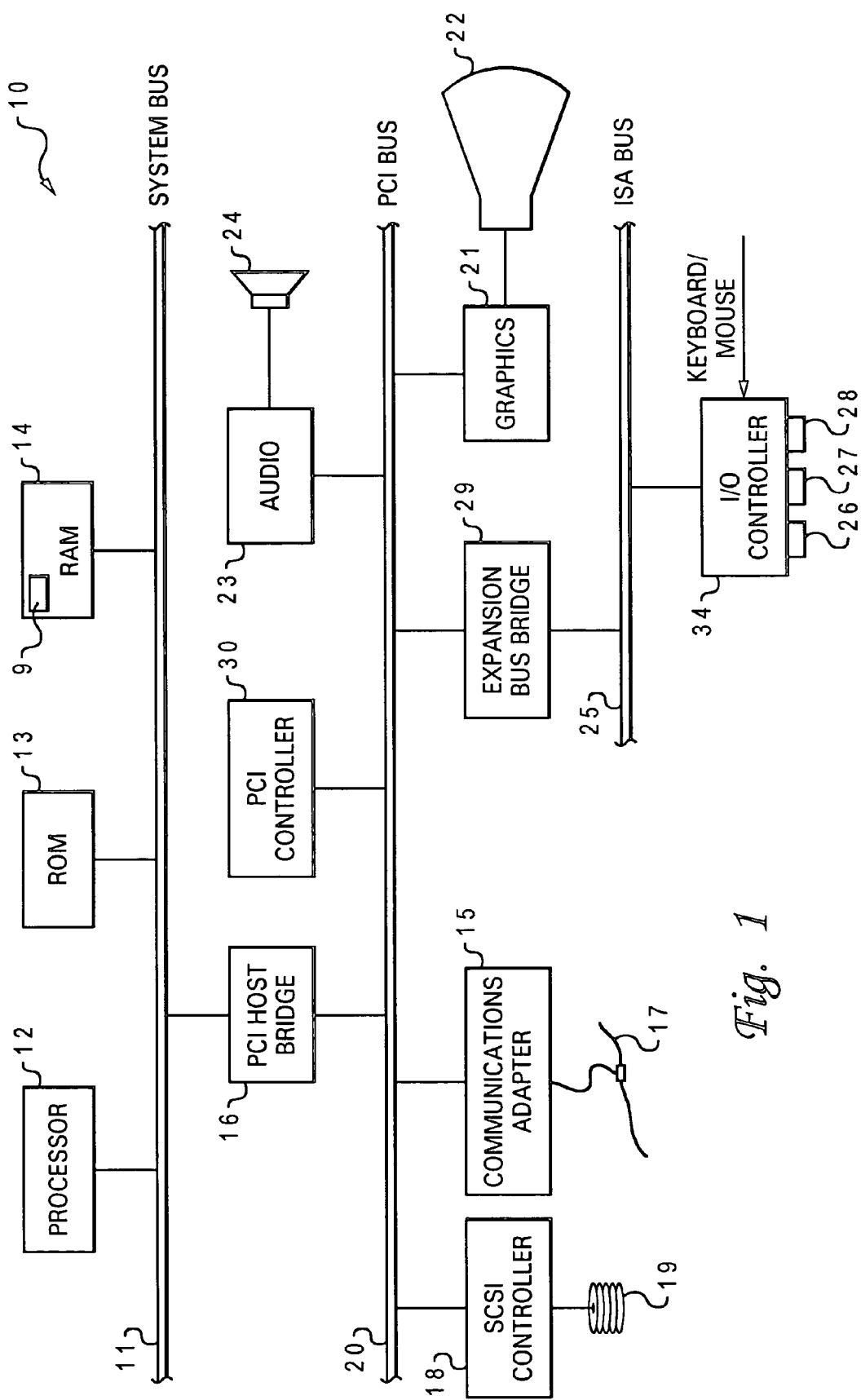
FIG. 1 depicts one embodiment of a data processing system with which the method, system and program of the present invention may advantageously be utilized.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 5, 6, 7 and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
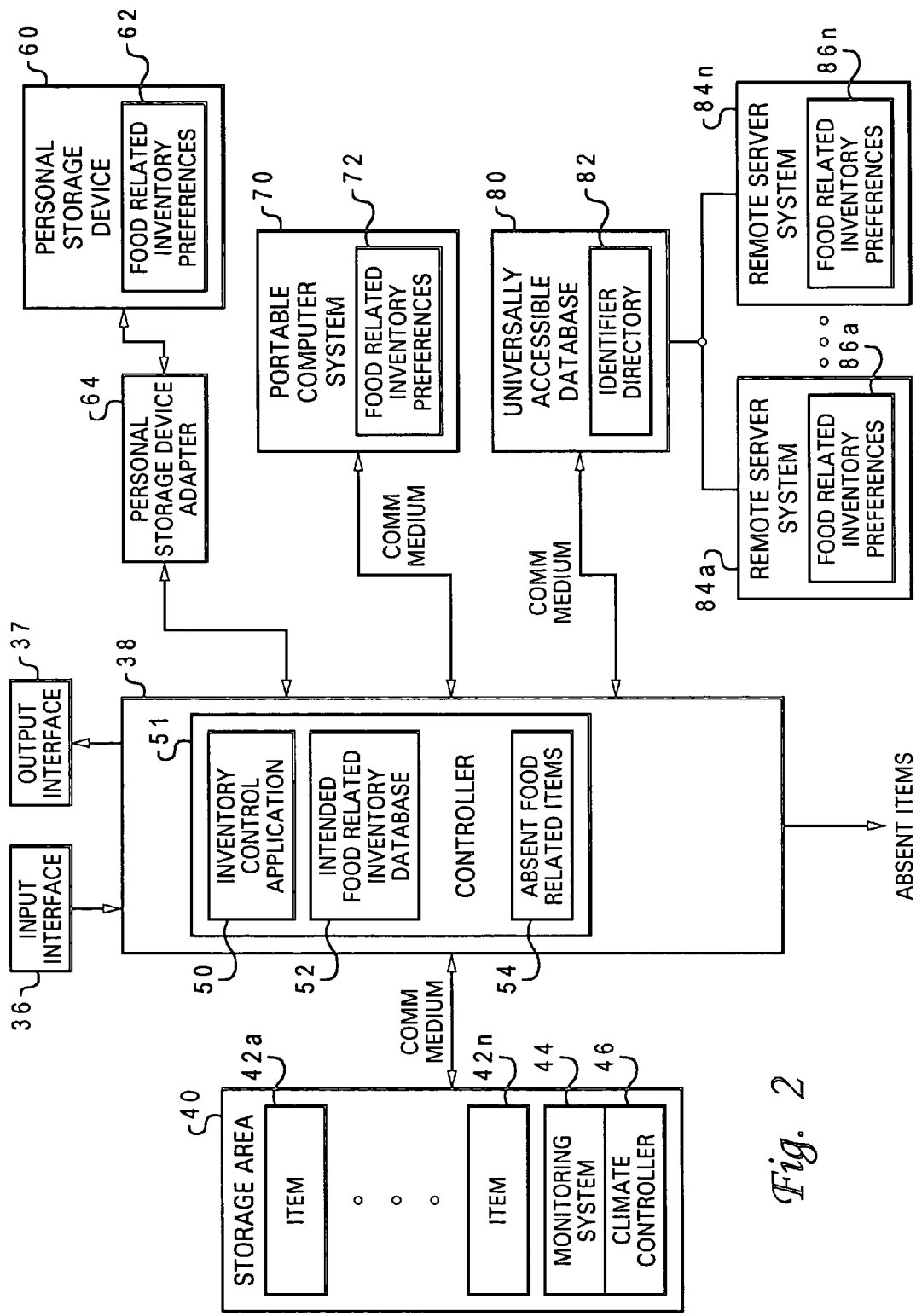
FIG. 2 illustrates a first embodiment of a block diagram of an electronic storage management system in accordance with the method, system, and program of the present invention.

With reference now to FIG. 2, there is illustrated a first embodiment of a block diagram of an electronic storage management system in accordance with the method, system, and program of the present invention. As depicted, controller 38 may be as computer system, such as data processing system 10, depicted in FIG. 1.

Controller 38 may communicate with a storage area 40 via a bi-directional communications medium (or across a communication interface). In addition, controller 38 may communicate with a personal storage device 60 that includes food-related inventory preferences 62 for a particular user. Moreover, controller 38 may communicate with a portable computer system 70 that includes food-related inventory preferences 72 for a particular user. Furthermore, controller 38 may communicate with a universally accessible database 80 that includes an identifier directory 82.

The communications medium may include wired or wireless communications or other communications media that enables bi-directional transmission of data. Moreover, the communications medium may include a link to a network, such as the Internet, or a direct data link.

In a wired embodiment of the communications medium, for example, storage area 40 connects to controller 38 via parallel, serial, or USB ports, or the communication adapter as depicted in FIG. 1. In a wireless embodiment of the communications medium, for example, storage area 40 is wirelessly connected to controller 38 via infrared, radio frequency (RF), cellular and other wireless transmissions which are detected by controller 38.

Data exchange across the communications medium is advantageously performed in at least one of multiple available data transmission protocols and is preferably supported by a common data structure format, such as the extensible mark-up language (XML) data structure format. Data transmission protocols may include, but are not limited to, Transmission Control Protocol (TCP), Internet a Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file that might be transmitted from storage area 40 to controller 38, as depicted below, preferably contains data that is distinguished by attributes on elements and may be wrappered within a larger element. For example, the data attributed to element "<TimeStamp></TimeStamp>" designates the time that the data was attributed to the XML data file.

<FOOD ITEM TimeStamp="888965153" MachineID="77" MachineName="Refrigerator" FoodAdd="Pickles" FoodAddAmount="16 oz" FoodRemove="Wheat Bread" FoodRemoveAmount="2 slices">

A second example of the same data in an alternate XML data format that includes elements is illustrated below.

<TimeStamp>888965153</TimeStamp>
    <MachineID>77</MachineID>
    <MachineName>Refrigerator</MachineName>
    <FoodAdd>Pickles</FoodAdd>
    <FoodAddAmount>16 oz</FoodAddAmount>
    <FoodRemove>Wheat Bread</FoodRemove>
    <FoodRemoveAmount>2 slices</FoodRemoveAmount>

In the example, 16 oz. of pickles are added to a refrigerator with a machine id of "77". In addition, two slices of wheat bread are removed from the refrigerator.

In addition, in the example of the XML data format as the common transmittable data format, a data validation file such as a document type definition (DTD) or schema is preferably utilized to validate XML data files. In addition, a schema preferably translates multiple XML data files. Moreover, a style sheet such as an extensible style sheet language (XSL) file is preferably utilized to provide a style specification for the XML data at the receiving system. In particular, DTDs, schemas, and XSL files may be, for example, transmitted with an XML data file to a receiving system or downloaded at the receiving system from an alternate source. In the present example, the DTD or schema would verify that all the data required for a food addition or removal is included in the XML data file.

Storage area 40 is advantageously a defined storage area for food and home related products. Examples of storage area 40 include, but are not limited to, a refrigerator, a freezer, a pantry, a storage closet and a food container. Food and home related products preferably include perishables, non-perishables, appliances and kitchen tools. Food and home related products in general will from here on be referred to as food-related items. Non-perishables are preferably defined to include all non-perishable inventory within a home such as food-related non-perishables and toiletries. Kitchen tools are preferably defined to include non-appliance kitchen items such as utensils, dishware, cookware, bakeware, etc.

Storage area 40 advantageously includes multiple food-related items 42a–42n, where the status of food-related items 42a–42n within storage area 40 is monitored according to a monitoring system 44. In addition, storage area 40 may include multiple partitions where monitoring system 44 monitors the status of food-related items 42a–42n within each of the multiple partitions. Particular sections of storage area 40 may be designated for a particular type of food-related item and the presence of that food-related item monitored by monitoring system 44. For example, a refrigerator may include a specific section for milk whereby the presence of milk within the refrigerator is monitored.

Monitoring system 44 may monitor the addition and removal of food-related items 42a–42n utilizing multiple diverse methods including, but not limited to, RF broadcasts, bar code scanning, infrared scanning, and semi-manual cataloging. In addition, alternate forms of tracking the status of food-related items 42a–42n may be utilized. Moreover, multiple types of hardware may be included with storage area 40 and/or controller 38 in order to implement monitoring system 44.

In an example, monitoring system 44 includes a bar code scanner that reads the bar codes of food-related items added to an removed from storage area 40. Controller 38 advantageously accesses a database of bar codes with associated food-related item descriptions in order to identify food-related items according to bar code scanning. An infrared scanner detects the amount remaining of each food-related item. A keypad is provided for a user to enter an identifier or description of food-related items that do not include a bar code for scanning.

Monitoring system 44 preferably transmits inventory adjustments in storage area 40 to controller 38 in the common transmittable data format via a communications medium. Advantageously, monitoring system 44 stores inventory adjustments until accessed at controller 38.

In addition, storage area 40 is controlled by a climate controller 46. Climate controller 46 advantageously adjusts multiple parameters of a climate including, but not limited to, temperature and humidity, according to a climate control setting received from controller 38. In particular, for storage area 40 with multiple partitions, climate controller 46 may control the climate within each of the multiple partitions, such that a single storage area includes multiple partitioned climates.

Controller 38 includes an inventory control application 50, an intended food-related inventory database 52 and an absent food-related items database 54 within a data storage medium 51. In the present embodiment, data storage medium 51 is depicted as locally accessible to controller 38, however in alternate embodiments, data storage medium may be externally or remotely accessible to controller 38.

Intended food-related inventory database 52 advantageously comprises a database of food-related items that are intended to be in storage according to storage needs for a particular user or a particular kitchen area and the current status of those food-related items in storage area 40. A listing of food-related items in intended food-related inventory database 52 is preferably compiled from multiple sources.

First, a base of items that should be maintained in storage for a particular kitchen area is included in intended food-related inventory database 52. For example, a suite may include a base of items that should be maintained in storage within a refrigerator, freezer and/or pantry of the suite. In another example, a particular amount of flour and sugar that should be maintained in storage for a pantry of a particular commercial kitchen may be included in a base of items. Moreover, in another example, particular snacks that should be maintained in storage in a pantry of a particular residence may be included in a base of items.

Second, food-related inventory preferences for a particular user, users or kitchen area are included in intended food-related inventory database 52. Food-related inventory preferences may include specified food preferences for a user and may include a listing of food-related items needs for meal plans scheduled for the particular user or kitchen area. For example, a particular user may include a specified preference for a particular amount of a particular type of cola to be maintained at the particular user's residence and at any suites that the user stays at while on business travel. Advantageously, food-related inventory preferences may be distinguished according to whether they are intended for a residence or for a temporary living space.

In another example, a scheduled meal plan for a kitchen area may include a listing of food-related items and amounts that are necessary for preparing the scheduled meal plan. A scheduled meal plan and necessary food-related items are advantageously determined by an electronic cookbook as described in U.S. patent application Ser. No. 09/560,380, herein incorporated by reference.

For the purpose of example, an XML data file that includes food-related inventory preferences for a particular user is depicted below. In the example, food-related inventory preferences for the user "EvanT" are included. The user indicates the need for two eggs for use on Feb. 10, 2001 according to an electronic recipe that is schedule for preparation on that day. In addition, the user indicates a preference for a gallon of milk per week.

<TimeStamp>888965153</TimeStamp>
<UserID>EvanT</UserID>
<FoodPref>eggs,2,2/20/01</FoodPref>
<FoodPref>milk,1 gallon,week</FoodPref>

Third, food-related items to be included in intended food-related inventory database 52 may be entered by a user via input interface 36. Input interface may include multiple types of devices including, but not limited to, a keyboard, a keypad, a mouse, and a vocal detection system.

In addition, food-related preferences advantageously include preferred climates at which the food-related items should be stored. For example, food-related preferences may include a particular brand of butter and a preferred temperature at which the butter should be maintained. For example, a user may prefer that the butter is stored so that the butter is soft when removed from the refrigerator.

Food-related inventory preferences for a user or kitchen area may be received at controller 38 via multiple devices. In a first example, a personal storage device adapter 64 coupled to controller 38 may detect food-related inventory preferences 62 from personal storage device 60. Examples of personal storage device 60 include, but are not limited to, a smart card and an ibutton™ (ibutton is a trademark of Dallas Semiconductor, Inc.). In another example, a user may enter food-related inventory preferences via input interface 36.

In another example, food-related inventory preferences 72 may be detected from a portable computer system 70 at controller 38 via a communications medium. Portable computer system 70 may include, but is not limited to including, a palm-top computer, a personal digital assistant (PDA), a cellular or digital telephone, or a notebook computer.

In still another example, food-related inventory preferences 86a–86n may be detected at controller 38 from remote server systems 84a–84n via universally accessible database 80. A particular universal identifier may be transmitted from controller 38 to universally accessible database 80 where the particular universal identifier is looked up in identifier directory 82. The listings for multiple universal identifier accounts, that are stored in identifier directory 82, point to the server address of the remote server system from among remote server systems 84a–84n where the data for each universal identifier account is stored and may include other data about the universal identifier account, such as the owner of the account, passwords for access to the account, etc. Universally accessible database 80 may include a single server system or multiple server systems that provide universal access to the listings of universal identifier accounts.

In the present example, a universal identifier advantageously includes an alphanumeric identifier, such as a web page identifier, that may be utilized to access data stored at a particular server that includes food-related inventory preferences for a particular user. In the example, a first universal identifier may be associated with food-related inventory preferences 86a of remote server system 84a for a first user, while a second universal identifier is associated with food-related inventory preferences 86n of remote server system 84n for a second user. Remote server systems 84a–84n may include systems including, but not limited to, home computer systems, data storage provider server, web applications servers (WAPs), portable computers, and mainframes.

Inventory control application 50 preferably updates intended food-related inventory database 52 with base items for a particular kitchen area and with food-related inventory preferences for a particular kitchen area and/or user. In addition, inventory control application 50 advantageously adjusts intended food-related inventory database 52 according to food-related item status updates received from monitoring system 44. For example, if a can of a particular type of cola is removed from storage device 40, monitoring system 44 updates controller 38 according to the removal and inventory control application 50 reduces the number of cans of the particular type of cola included in intended food-related inventory database 52 by one.

In addition inventory control application 50 advantageously adjusts absent food-related items 54 in response to updating and adjusting intended food-related inventory database 52. Absent food-related items 54 preferably includes all items for which an expected amount is included in intended food-related inventory database 52, however that amount is not present in storage area 40. For example, if storage area 40 is intended to contain fourteen eggs, where six eggs are required as base items for a kitchen area, four eggs are intended for cooking omelets the next morning and four more eggs are intended for baking a cake in two days, however storage area 40 only contains nine eggs, then absent food-related items 54 would indicate that five eggs are absent from the intended inventory.

In addition, a recommended date by which the inventory item needs to be available is advantageously included in absent food-related items 54. In the egg example above, the egg inventory would be recommended for purchase within the next two days so that the cake can be prepared.

Absent food-related items 54 are preferably transmitted in the common transmittable protocol from controller 38 via a communications medium. Advantageously, absent food-related items 54 are transmitted to an electronic market device such as the electronic market device described in U.S. patent application Ser. No. 09/560,319, herein incorporated by reference, that places orders for absent food-related items 54 at one or multiple retailers.

In one example of an application of the present invention, storage area 40 monitors food-related items in a pantry. Food-related inventory preferences for each of the members of the household have been retrieved into intended food-related inventory database 52. In particular, food-related inventory preferences for the primary chef of the household include food-related inventory preferences for upcoming scheduled meals. Controller 38 continuously updates absent food-related items 54 according to monitored inventory by monitoring system 44. Portable computer system 70 for the primary chef of the household retrieves absent food-related items 54 from controller 38 prior to going shopping, such that portable computer system 70 comprises an electronic shopping list for the household.

In another example, when a user arrives at a hotel suite or other temporary living space, the user proffers his/her personal storage device 60 to personal storage device adapter 64 coupled to a controller for a kitchenette within the suite that monitors food-related item storage for the pantries and refrigerator. Intended food-related inventory database 52 includes base food-related inventory preferences that are determined by the hotel suite to be maintained. For example, a supply of coffee, drinks and popcorn packages may be included in the base food-related items. In addition, the food-related inventory preferences 62 for the user are retrieved and updated in intended food-related inventory database 52. Advantageously, a user may include in food-related inventory preferences specific food-related items that are preferred when traveling, as opposed to being at home. Absent food-related items database 54 is updated and a list of absent food-related items is transmitted to a central server system for the hotel from which orders may be made to purchase the absent food-related items. The user's account may be automatically debited according to the purchases and the absent food-related items provided in the user's hotel suite.

Figure 3:
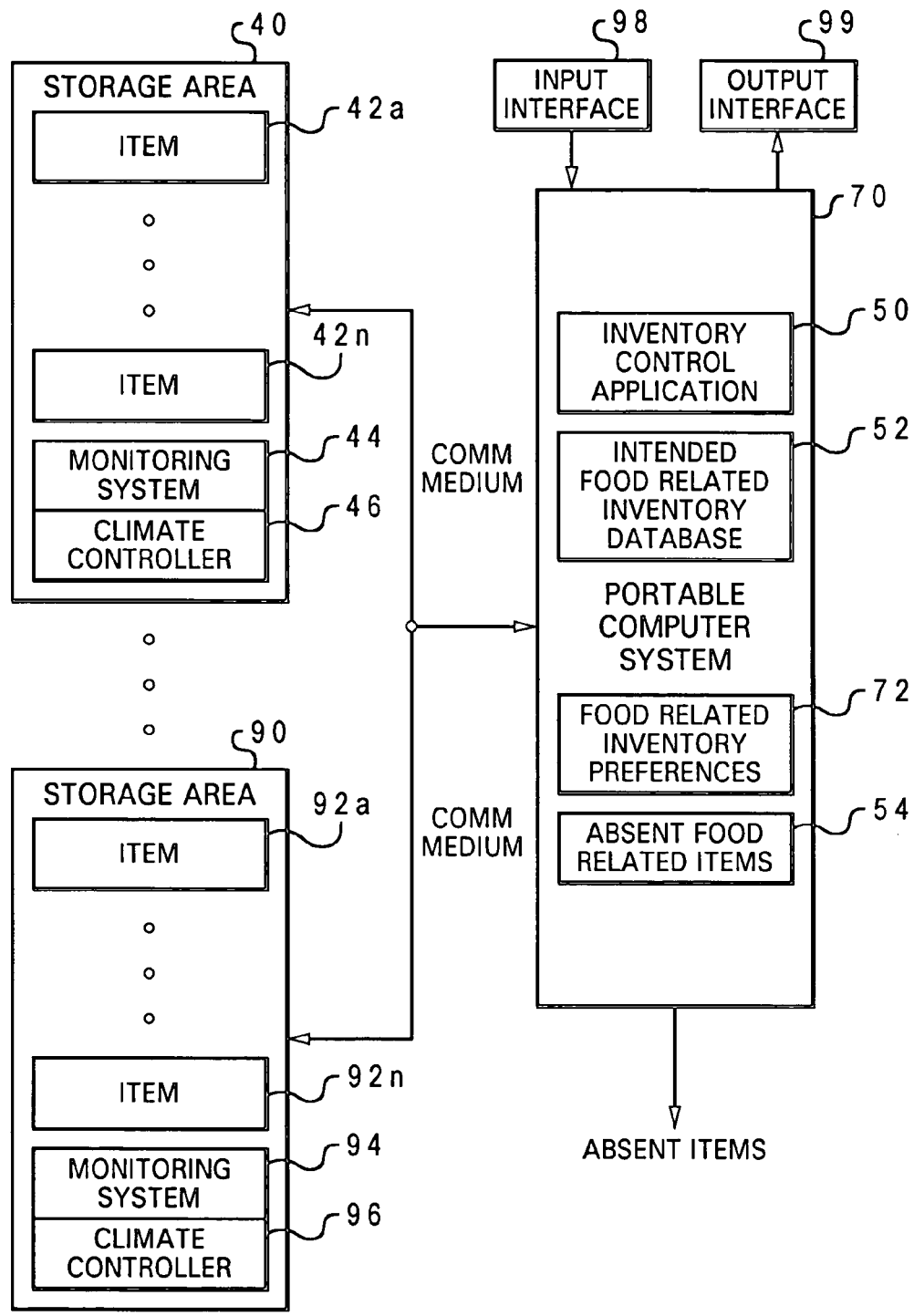
FIG. 3 depicts a second embodiment of a block diagram of an electronic storage management system in accordance with the method, system, and program of the present invention.

Referring now to FIG. 3, there is depicted a second embodiment of a block diagram of an electronic storage management system in accordance with the method, system, and program of the present invention. As depicted, portable computer system 70 functions as a controller for multiple storage areas 40 and 90 that represent multiple, diverse storage areas and may be located at remote locations from one another.

Storage area 90 includes items 92a–92n, a monitoring system 94 and a climate controller 96. Monitoring system 94 and climate controller 96 preferably function to monitor current inventory and control the climate of the current inventory.

Portable computer system 70 includes inventory control application 50, intended food-related inventory database 52, absent food-related items 54 and food-related inventory preferences 72. Input to portable computer system 70 may be provided via input interface 98 and/or a communications medium where an alternate data processing systems provides data. In addition, output from portable computer system 70 may be provided by output interface 99.

Portable computer system 70 preferably functions to perform all the functions of controller 38 of FIG. 2 and of portable computer system 70 of FIG. 2. A user may retrieve inventory updates from each of storage areas 40 and 90 and update climate controllers 46 and 96 according to food-related inventory climate preferences.

Advantageously, each of storage areas 40 and 90 maintains a database of current inventory adjustments such that when portable computer system 70 interfaces with either storage area 40 or 90, the database of current inventory adjustments is transferable. In addition, advantageously, portable computer system 70 may be utilized to control multiple storage areas that lack controllers and/or portable computer system 70 may cooperatively control multiple storage areas with accessible controllers for the storage areas. In addition, portable computer system 70 may monitor items entering and leaving a storage area.

In an application of the present invention, each of storage areas 40 and 90 maintains a current inventory of food-related items within a particular household. A member of a household retrieves current inventories for storage areas 40 and 90 at portable computer system 70 and thereby has an electronic shopping list for multiple storage areas within a household.

Figure 4:
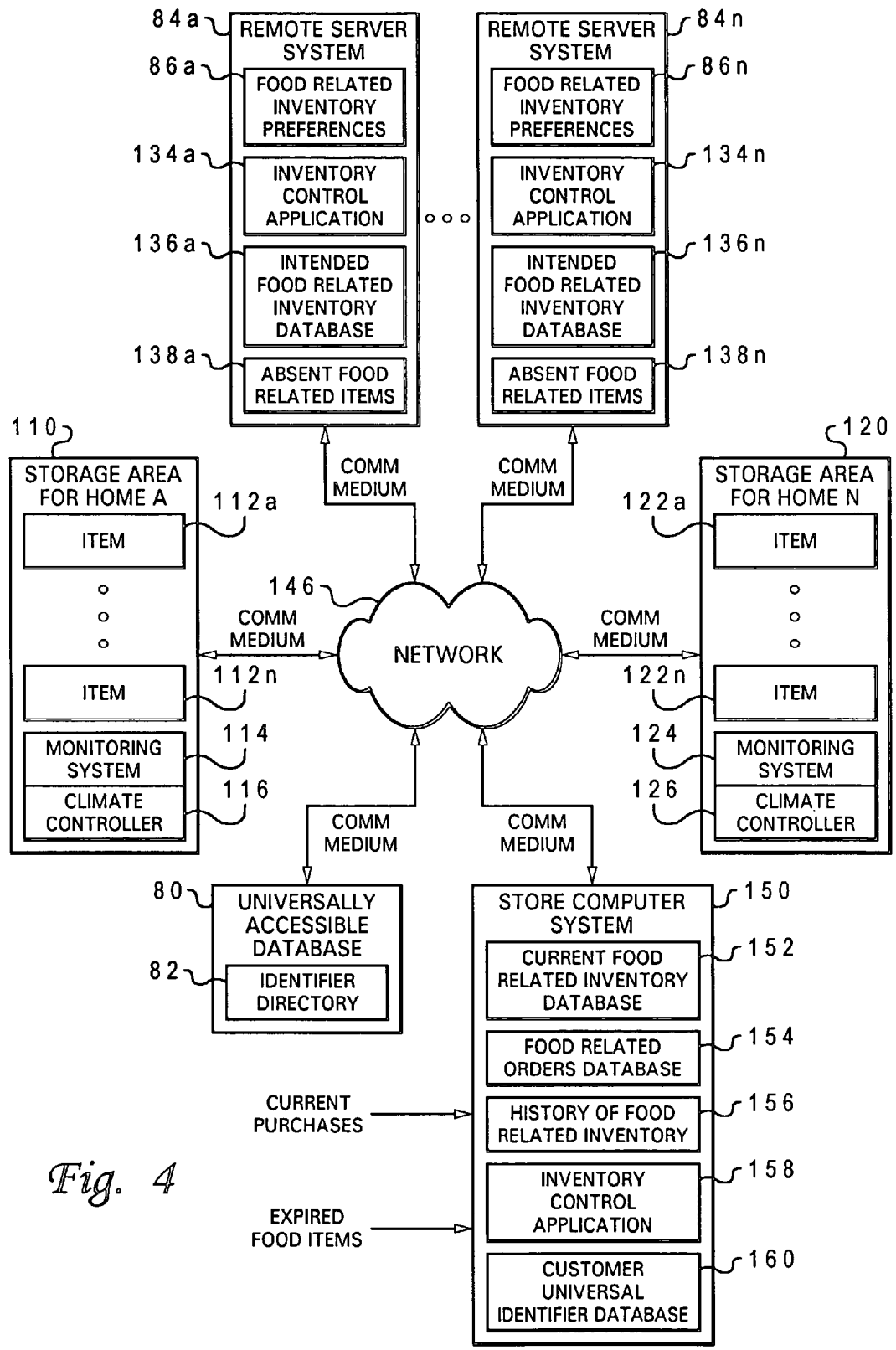
FIG. 4 illustrates an embodiment of a block diagram of a store inventory management system in accordance with the method, system, and program of the present invention.

With reference now to FIG. 4, there is illustrated an embodiment of a block diagram of a store inventory management system in accordance with the method, system, and program of the present invention. As depicted, each of storage area for home A 110, storage area for home B 120, remote server systems 84a–84n, universally accessible database 80 and store computer system 150 access a network 146 via a communication medium that enables bi-directional communication between the devices. Network 146 advantageously includes the Internet and other universally accessible networks, however may include other types of networks, such as a local area network (LAN).

Storage area for home A 110 preferably monitors at least one storage area within a home A and advantageously includes multiple items 112a–112n, a monitoring system 114 and a climate controller 116. Storage area for home N 120 preferably monitors at least one storage area within a home N and advantageously includes multiple items 122a–122n, a monitoring system 124 and a climate controller 126.

Storage area for home A 110 advantageously transmits a monitored inventory according to a universal identifier associated with home A to remote server system 84a. In particular, storage area for home A 110 may transmit monitored inventory with a universal identifier that is associated with storage area for home A to network 146. The universal identifier associated with home A is transmitted to universally accessible database 80 and looked up in identifier directory 82. An address for the remote server system associated with the universal identifier is determined (in this case an address for remote server system 84a) and a communication link between storage area for home A 110 and remote server system 84a is established.

The monitored inventory received at remote server system 84a from home A 110 would then be utilized by inventory control application 134a to update intended food-related inventory database 136a according to the monitored data and therefore update absent food-related items according to the monitored data. Remote server system 84a preferably includes food-related inventory preferences 86a for a particular user or users that are also utilized by inventory control application 134a to update intended food-related inventory database 136a and that may be adjusted by accessing remote server system 84a.

In addition, storage area for home N 120 advantageously transmits a monitored inventory according to a universal identifier associated with home N to remote server system 84n. In particular, storage area for home N 120 may transmit monitored inventory with a universal identifier that is associated with storage area for home N to network 146. The universal identifier associated with home N is transmitted to universally accessible database 80 and looked up in identifier directory 82. An address for the remote server system associated with the universal identifier is determined (in this case an address for remote server system 84n) and a communication link between storage area for home N 120 and remote server system 84n is established.

The monitored inventory received at remote server system 84n from home N 120 would then be utilized by inventory control application 134n to update intended food-related inventory database 136n according to the monitored data and therefore update absent food-related items according to the monitored data. Remote server system 84n preferably includes food-related inventory preferences 86n for a particular user or users that are also utilized by inventory control application 134n to update intended food-related inventory database 136n and that may be adjusted by accessing remote server system 84n.

A user may advantageously designate that absent food-related items are to be broadcasted from the user's universal account to a particular universal identifier at a periodic rate, continuously, or alternatively, a user may provide a universal identifier to a particular retailer, such as a grocery store, whereby the retailer can monitor absent food-related items from the associated remote server system.

In the present example, store computer system 150 advantageously includes a customer universal identifier database 160 that includes universal identifiers provided by multiple customers to the store. Store computer system 150 is advantageously enabled to transmit any of the universal identifiers to network 146 and access absent food-related items and the intended food-related inventory database from the remote server system associated with the universal identifier. For example, store computer system 150 may include a universal identifier associated with home A. In response to transmitting the universal identifier associated with home A to universally accessible database 80, the store would preferably receive access to intended food-related items database 136a and absent food-related items database 138a for home A.

An inventory control application 158 executing on store computer system 150 advantageously utilizes accessed absent food-related items database to determine whether or not additional orders for particular food-related items need to be ordered. In particular, inventory control application 158 compares a current food-related inventory database 152 for the store, a food-related orders database 154, and a history of food-related inventory database 158 to determine whether or not additional orders for particular food-related items need to be ordered in response to the absent food-related items databases received from multiple homes.

Current food-related inventory database 152 is adjusted by inventory control application 158 according to current purchases made at the store and on-line and entry of expired food items. Food-related orders database 154 preferably includes current orders for the store and expected arrival times. History of food-related inventory database 158 includes a history of inventory and purchases that is searchable according to multiple types of criteria, such as a particular product and a particular time period.

In determining food orders, a history of inventory and purchases is consulted in order to determine average flow for a particular product and/or time period. For example, purchases of pumpkin filling the prior year during the months of November and December may be utilized to estimate pumpkin filling purchases for a subsequent year during the same months. However, in analyzing the intended food-related inventory databases accessed for multiple customers, it may be determined that many households have extra cans of pumpkin filling still in inventory from the previous year that is still usable and therefore those households will not purchase pumpkin filling that year. Alternatively, absent food-related items databases from multiple households may indicate that each household will be purchasing multiple cans of pumpkin filling and therefore an additional order of pumpkin filling needs to be placed.

In addition, inventory control application 158 may utilize absent food-related items accessed for multiple households in order to determine use of shelf space. For example, if a large percentage of households polled are including a particular brand of water in their preferred inventory over other brands of water, then the particular brand of water may be provided more shelf space. In addition, if multiple households include a particular product, such as a specialized cheese in their preferred inventory, but the store does not stock the specialized cheese, the store may determine to place an order and provide shelf space for the specialized cheese.

Moreover, inventory control application 158 may utilize absent food-related items to select electronic coupons that should be offered to particular households or to any household. Electronic coupons and special offerings for brands of products that are absent in a household may be transmitted with the universal identifier for the household to one of remote server systems 84a–84n.

Figure 5:
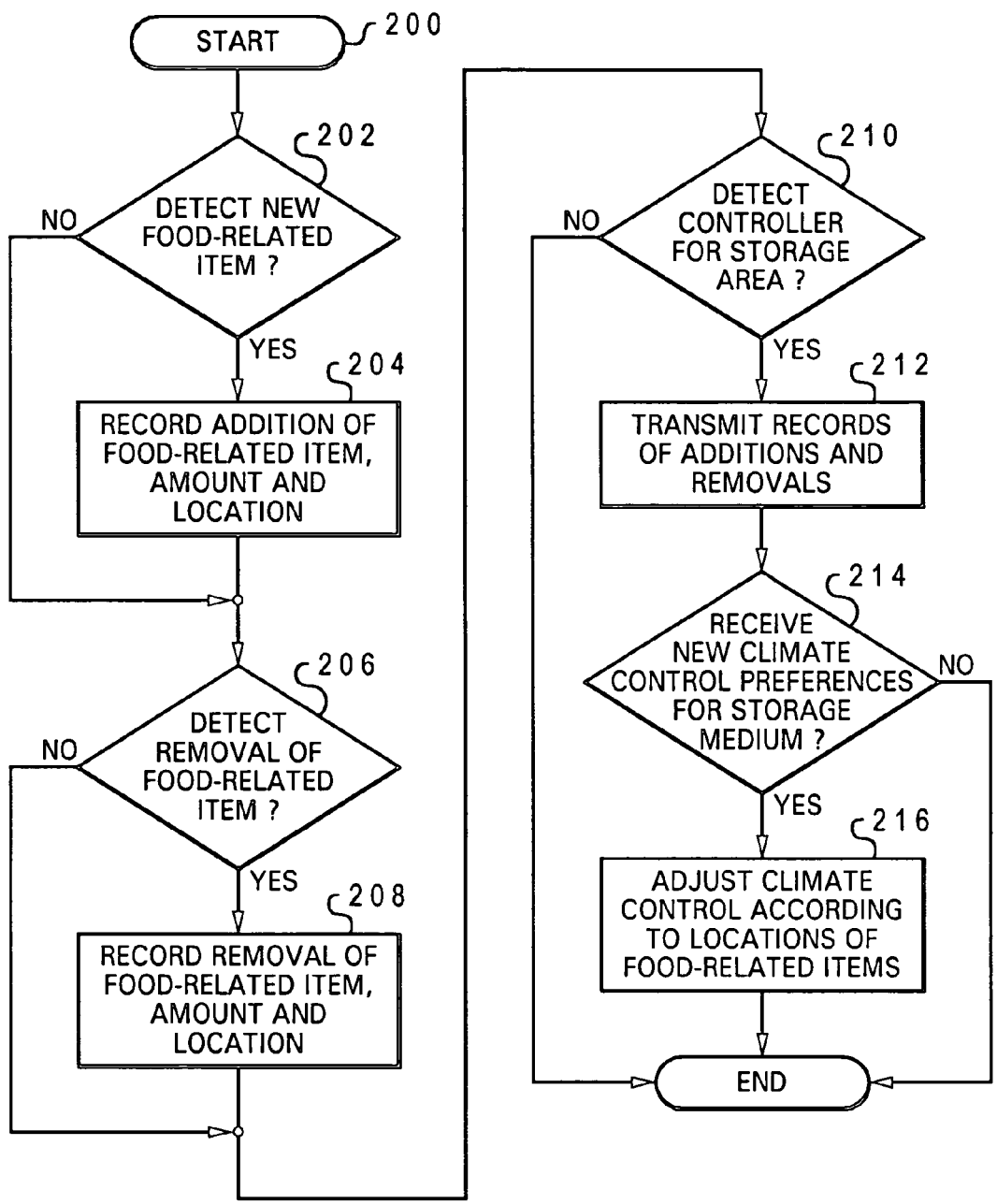
FIG. 5 depicts an embodiment of a high level logic flowchart of a process and program for controlling a storage area in accordance with the present invention.

Referring now to FIG. 5, there is depicted an embodiment of a high level logic flowchart of a process and program for controlling a storage area in accordance with the present invention. As depicted, the process starts at block 200 and thereafter proceeds to block 202. Block 202 illustrates a determination as to whether or not a new food-related item is detected in the storage area. If a new food-related item is not detected, then the process passes to block 206. If a new food-related item is detected, then the process passes to block 204. Block 204 depicts recording an addition of a food-related item, amount and storage area location; and the process passes to block 206.

Block 206 illustrates a determination as to whether or not removal of a food-related item is detected from the storage area. If removal of a food-related item is not detected, then the process passes to block 210. If removal of a food-related item is detected, then the process passes to block 208. Block 208 depicts recording a removal of a food-related item, amount and storage area location; and the process passes to block 210.

Block 210 depicts a determination as to whether or not a controller for the storage area is detected. If a controller is not detected, then the process ends. If a controller is detected, then the process passes to block 212. Block 212 illustrates transmitting any records of additions and removals from the storage area to the controller. Next, block 214 depicts a determination as to whether or not new climate control preferences are received for the storage medium. If new climate control preferences are not received, then the process ends. If new climate control preferences are received, then the process passes to block 216. Block 216 illustrates adjusting the climate controller according to the locations of the food-related items for which new climate control preferences are received; and the process ends.

Figure 6:
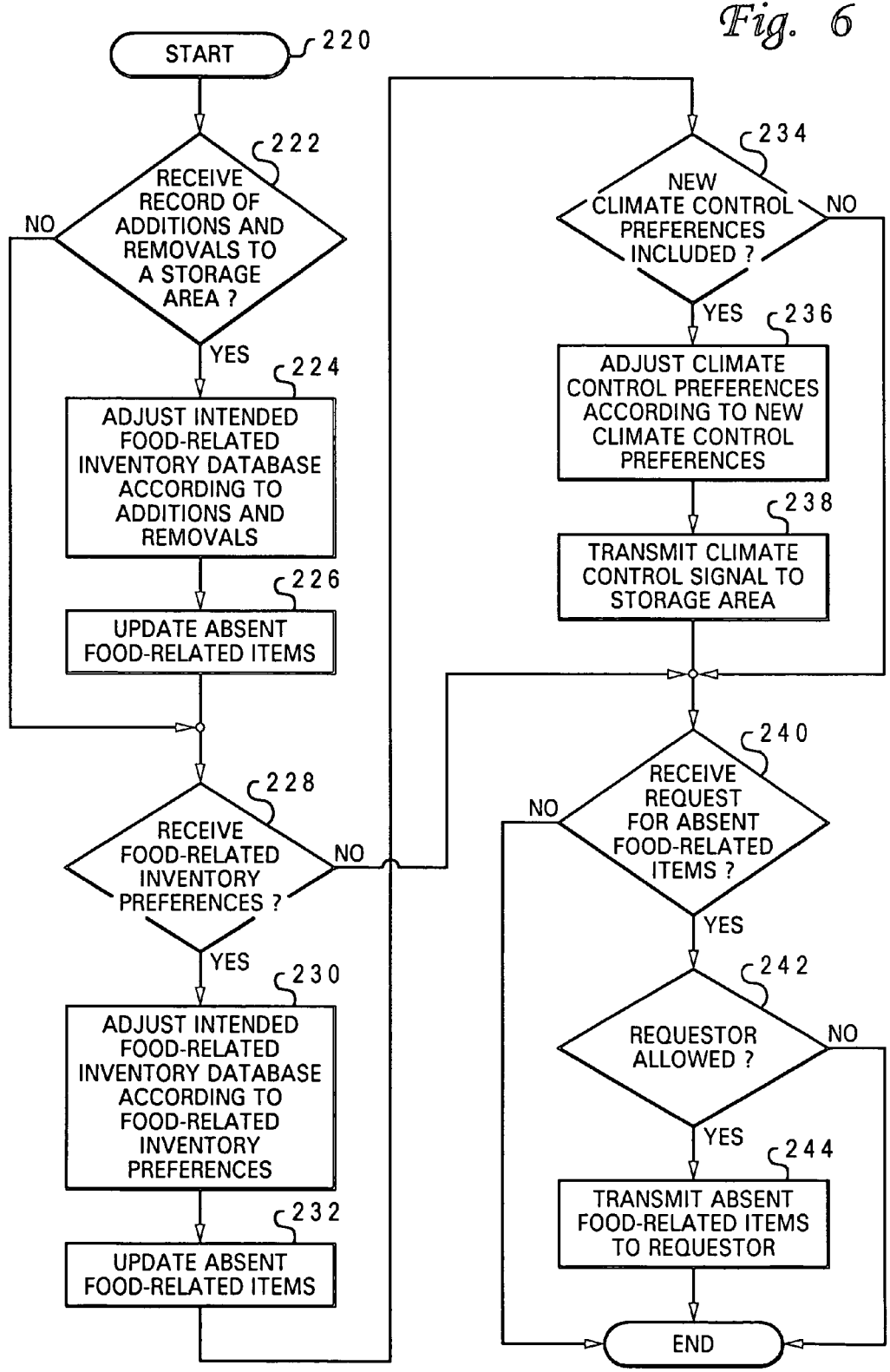
FIG. 6 illustrates an embodiment of a high level logic flowchart of a process and program for monitoring a storage area in accordance with the present invention.

With reference now to FIG. 6, there is illustrated an embodiment of a high level logic flowchart of a process and program for monitoring a storage area in accordance with the present invention. As depicted, the process starts at block 220 and thereafter proceeds to block 222. Block 222 illustrates a determination as to whether or not a record of additions and removals from a storage area is received at a controller. The controller may be, for example, permanently coupled to the storage area, temporarily coupled to the storage area or remotely coupled to the storage area via a network. If a record is not received, then the process passes to block 228. If a record is received, then the process passes to block 224. Block 224 depicts adjusting the intended food-related inventory database according to the additions and removals. Next, block 226 illustrates updating absent food-related items according to the additions and removals; and the process passes to block 226.

Block 226 depicts a determination as to whether or not food-related inventory preferences are received at the controller. If food-related inventory preferences are not received, then the process passes to block 240. If food-related inventory preferences are received, then the process passes to block 230. Block 230 illustrates adjusting the intended food-related inventory according to the food-related inventory preferences. Next, block 232 depicts updating the absent food-related items according to the food-related inventory preferences; and the process passes to block 234.

Block 234 illustrates a determination as to whether or not new climate control preferences are included with the food-related inventory preferences. If new climate control preferences are not included, then the process passes to block 240. If new climate control preferences are included, then the process passes to block 236. Block 236 depicts adjusting climate control preferences for the intended food-related inventory according to the climate control preferences. Next, block 238 illustrates transmitting the climate control signal for the new climate control preferences to the storage area; and the process passes to block 240.

Block 240 depicts a determination as to whether or not a request for absent food-related items is received from a particular requestor. If a request is not received, then the process ends. If a request is received, then the process passes to block 242. Block 242 illustrates a determination as to whether or not the requester is allowed to access the absent food-related items for the user. If the requestor is not allowed access, then the process ends. If the requester is allowed access, then the process passes to block 244. Block 244 depicts transmitting the absent food-related items to the requester; and the process ends.

Figure 7:
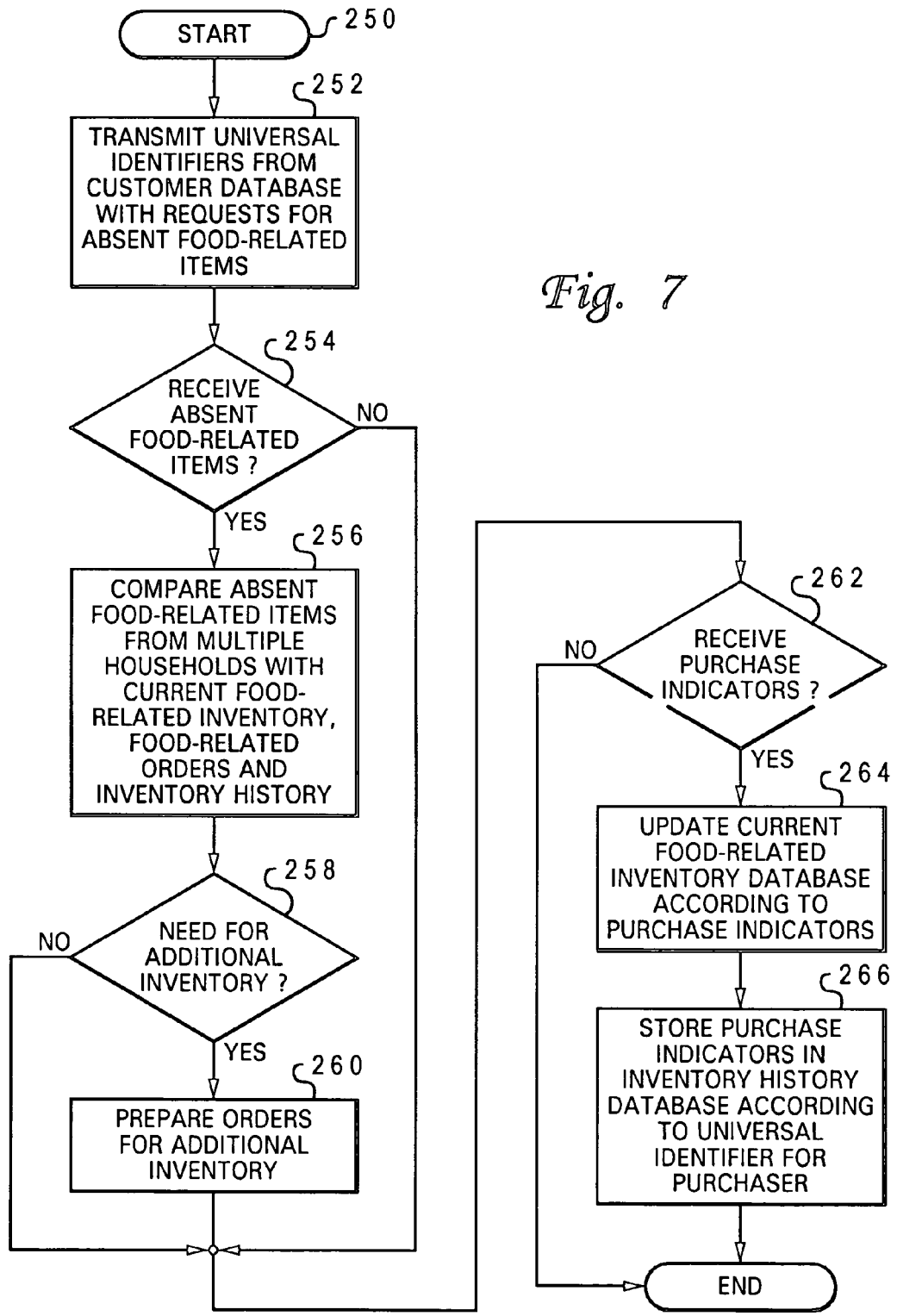
FIG. 7 depicts an embodiment of a high level logic flowchart of a process and program for monitoring store inventory in accordance with the present invention.

Referring now to FIG. 7, there is depicted an embodiment of a high level logic flowchart of a process and program for monitoring store inventory in accordance with the present invention. As illustrated, the process starts at block 250 and thereafter proceeds to block 252. Block 252 depicts transmitting universal identifiers from a customer database with requests for absent food-related items to a universally accessible database. Next, block 254 illustrates a determination as to whether or not absent food-related items are received in return. If absent-food-related items are not received, then the process passes to block 262. If absent food-related items are received, then the process passes to block 256.

Block 256 depicts comparing the absent food-related items for multiple households with current food-related inventory, food-related orders and inventory history. Next, block 258 illustrates a determination as to whether not additional inventory is needed in response to the comparison. If additional inventory is not needed, then the process passes to bloc 262. If additional inventory is needed, then the process passes to block 260. Block 260 depicts preparing orders for additional inventory; and the process passes to block 262.

Block 262 illustrates a determination as to whether or not purchase indicators are received. If purchase indicators are not received, then the process ends. If purchase indicators are received, then the process passes to block 264. Block 264 depicts updating the current food-related inventory database according to the purchase indicators. Next, block 266 illustrates storing purchase indicators in the inventory history database according to the universal identifier for the purchaser; and the process ends.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing inventory, said method comprising the steps of:
    receiving food-related inventory preferences for a each of a plurality of users at a controller for a particular storage area that monitors current food-related inventory in said particular storage area;
    receiving food-related inventory preferences for a particular user from among said plurality of users at said controller from a personal electronic memory digital data storage device proffered by said particular user at said controller;
    adjusting a current database of intended food-related inventory for said particular storage area at said controller according to said food-related inventory preferences; and
    determining a selection of food-related items from among said database of intended inventory items that are absent from said particular storage area, such that food-related inventory that is intended for said particular storage area is managed.

2. The method for managing inventory according to claim 1, said step of receiving food-related inventory preferences for a each of a plurality of users at a controller for a particular storage area that monitors current food-related inventory in said particular storage area, further comprising the step of:
    receiving food-related inventory preferences for each of said plurality of users at said controller from a plurality of portable computer systems.

3. The method for managing inventory according to claim 1, said step of receiving food-related inventory preferences for a each of a plurality of users at a controller for a particular storage area that monitors current food-related inventory in said particular storage area, further comprising the step of:
    receiving food-related inventory preferences for a particular user from among said plurality of users at said controller via a particular universally accessible server system according to a particular universal identifier associated with said particular user.

4. The method for managing inventory according to claim 1, said step of receiving food-related inventory preferences for a each of a plurality of users at a controller for a particular storage area that monitors current food-related inventory in said particular storage area, further comprising the step of:
    receiving food-related inventory preferences in an extensible mark-up language data format.

5. The method for managing inventory according to claim 1, said method further comprising the step of:
    periodically receiving records of additions and removals of food-related items from said particular storage area at said controller.

6. The method for managing inventory according to claim 1, said step of adjusting a database of intended food-related inventory for said particular storage area at said controller according to said food-related inventory preferences, further comprising the step of:
    adding said food-related inventory preferences to a base list of amounts of food-related items intended to be maintained in inventory of said particular storage area.

7. The method for managing inventory according to claim 1, said step of adjusting a database of intended food-related inventory for said particular storage area at said controller according to said food-related inventory preferences, further comprising the step of:
    adding said food-related inventory preferences to previously received food-related inventory preferences for amounts of food-related items intended to be maintained in inventory of said particular storage area.

8. The method for managing inventory according to claim 1, said step of adjusting a database of intended food-related inventory for said particular storage area at said controller according to said food-related inventory preferences, further comprising the step of:
    adjusting amounts of food-related items included in said database of intended food-related inventory according to additions and removal of food-related items detected from said particular storage area.

9. The method for managing inventory according to claim 1, said step of adjusting a database of intended food-related inventory for said particular storage area at said controller according to said food-related inventory preferences, further comprising the step of:
    combining said food-related inventory preferences for each of said plurality of users.

10. The method for managing inventory according to claim 1, said method further comprising the step of:
    transmitting said selection of food-related items that are absent from said particular storage area to a store.

11. The method for managing inventory according to claim 1, said method further comprising the steps of:
    receiving a request from a particular store for said selection of food-related items that are absent from said particular storage area at a universally accessible server system according to a particular universal identifier associated with said particular storage area;
    enabling access to said selection of food-related items that are absent from said particular storage area if said particular store is included in a plurality of allowable requesters for said particular storage area.

12. A method for managing inventory by a portable computer system, said method comprising the steps of:
    receiving food-related inventory preferences for each of a plurality of users at a portable computer system that monitors current food-related inventory in a particular storage area;

receiving food-related inventory preferences for a particular user from among said plurality of users at said controller from a personal electronic memory digital data storage device proffered by said particular user proffered by said particular user at said controller;

adjusting a current database of intended food-related inventory for said particular storage area at said portable computer system according to said food-related inventory preferences; and determining a selection of food-related items from among said database of intended inventory items that are absent from said particular storage area, such that food-related inventory that is intended for said particular storage area is managed by said portable computer system.

* * * * *